(No Model.)
S. S. ELDER.
TIRE FOR VEHICLE WHEELS.
No. 562,811. Patented June 30, 1896.
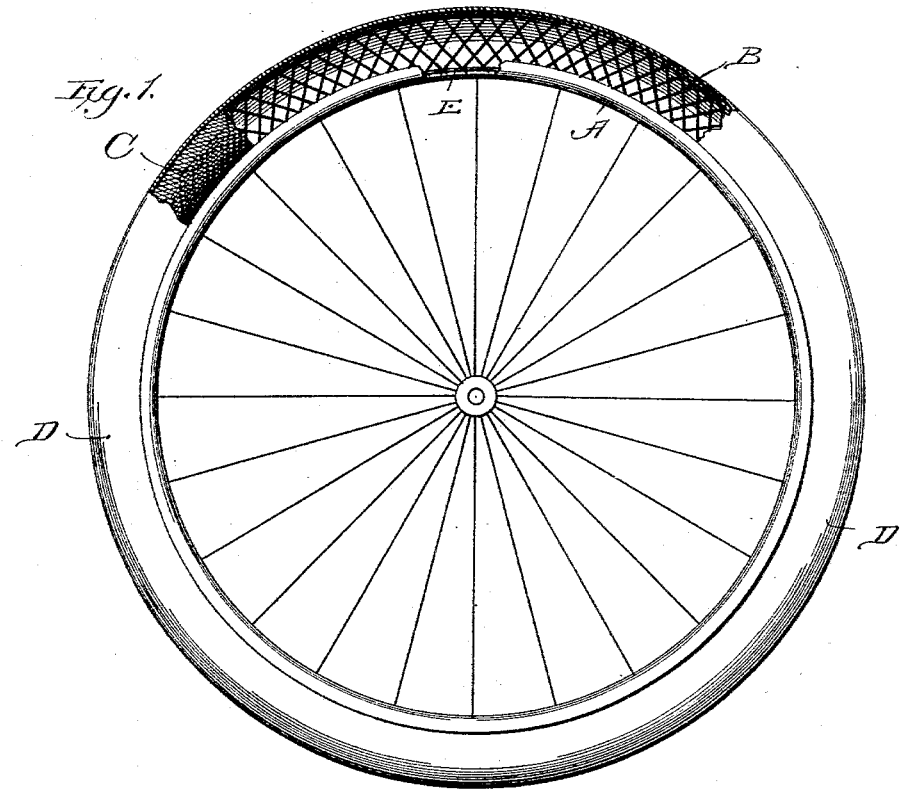
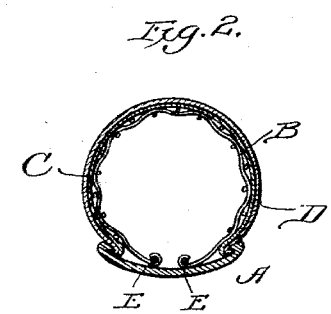
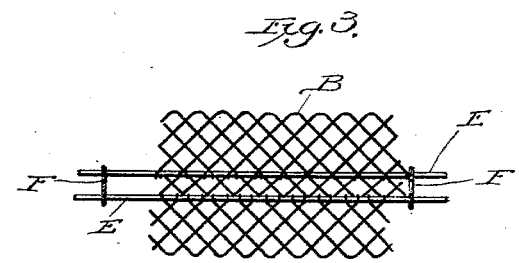
WITNESSES:
Harry S. Rohrer.
Frank A. Spencer.
Samuel S. Elder
INVENTOR
BY J. B. J. Tupper
ATTORNEY.

UNITED STATES PATENT OFFICE.

SAMUEL S. ELDER, OF SPRINGFIELD, ILLINOIS.

TIRE FOR VEHICLE-WHEELS.

SPECIFICATION forming part of Letters Patent No. 562,811, dated June 30, 1896.

Application filed February 5, 1896. Serial No. 578,119. (No model.)

*To all whom it may concern:*

Be it known that I, SAMUEL S. ELDER, a citizen of the United States, residing at Springfield, in the county of Sangamon and State of Illinois, have invented certain new and useful Improvements in Tires for Vehicle-Wheels; and I hereby declare the following to be a full, clear, and exact description of the invention, such as will enable others skilled in the art to which it appertains to make and use the same.

My invention relates especially to improvements in tires for bicycles or other light vehicles, and aims to produce a tire which shall have the requisite degree of elasticity, together with great durability and also freedom from liability to collapse when so constructed as to provide for inflation of the same.

The special feature of my invention consists, essentially, in the employment in a tire of a central supporting-core formed of interwoven strands or strips of elastic metal inclosed within an elastic covering of rubber or other suitable material, combined with special means for attaching the woven core to the concave outer surface of the rim, and for increasing the elasticity and resiliency of such core.

In the drawings, Figure 1 represents a side view of a wheel furnished with one of my tires, some of the parts being broken away to show the internal construction. Fig. 2 is a transverse section of the tire and metal rim or felly. Fig. 3 is a view, looking outwardly, of the inner side of a segment of the interwoven or netted metal tube forming the central core of my tire.

My tire is provided with the usual curved metal rim or felly A. The tubular woven or netted core B rests upon the outer concave surface of the rim A. Said core is composed of strands or strips of elastic wire, either round or flat, preferably of steel, of suitable gage, interwoven so as to form a network with rhomboidal meshes, and shaped into a tube adapted to fit the circumference of the wheel-rim. The several strands of wire run (preferably) around the tube spirally and diagonally, that is to say, at an angle of about forty-five degrees to the radius of the wheel. The inner circumference of the tube being less than the outer, it is obvious that the strands of wire must approach each other on the inward portions of the tube, or in other words that the meshes of the fabric must be smaller in the portion of the tube toward the center of the wheel than in the portion farther from the center.

The tube may be constructed with the several strands of metal passing around the tube continuously and repeatedly; but I prefer to sever the strands at about the point where they come in contact with the curved metal rim A, and to secure their ends to tie-wires or draw-bands E E, which are two in number, and extend circumferentially and parallel with each other around the wheel in close contact with the outer face of the rim A. The ends of the several strands forming the core are secured to these tie-wires, the ends upon each side being attached to the tie-wire upon that side. Said tie-wires are separated from each other by a slight space, sufficient to admit of their being forced slightly toward each other as the strands yield to the strains upon them when in use, thus greatly increasing the resiliency of the core. Suitable open loops or links F F extend between the tie-wires at proper intervals, to prevent them from separating too far, but allowing them to yield toward each other. Such tension upon the tie-wires as may be necessary to hold them firmly against the rim A may be secured by turnbuckles or other suitable means.

The covering for my tire may be constructed in any preferred manner, but I have found the most suitable to be one composed of an inner layer of canvas and an outer face of rubber, the two being vulcanized together, but any appropriate form of rubber, leather, or other covering may be employed. The edges of the covering are to be firmly secured between the outer surface of the central interwoven metal core and the inner edges of the metal rim.

If the covering is of rubber, the method shown in Fig. 2 is a convenient one, in which inwardly-projecting shoulders or flanges on the edge of the rim A are made to engage corresponding recessed grooves in the edges of the rubber covering.

The rubber covering may be vulcanized in place on the metal core, or previous to being applied to the core, as may be preferred.

The interwoven metal core herein described may be adapted for use in connection with pneumatic tires, this construction preventing collapse of the tire in case of puncture or other accident.

I claim as my invention—

1. In a vehicle-tire, a central tubular body or core, B, formed of interwoven or netted elastic metal strands extending spirally and diagonally around the same, fitting the concave outer surface of the rim, said strands being severed along the inner circumference of the tubular core, and their ends secured to parallel tie-wires, E, E, extending longitudinally around said rim, substantially as set forth.

2. In a vehicle-tire, a central tubular body or core B, formed of interwoven or netted elastic metal strands extending spirally and diagonally around the same, fitting the concave outer surface of the rim, said strands being severed along the inner circumference of the tubular core, and their ends secured to parallel tie-wires, E, E, extending longitudinally around said rim, said tie-wires being provided with open connecting-links, F, F, substantially as set forth.

In testimony whereof I affix my signature in presence of two witnesses.

SAMUEL S. ELDER.

Witnesses:
HOWARD K. WEBER,
W. M. AYER.